BOUNDARY LAYER CONTROL ASSEMBLY

Original Filed April 27, 1961 3 Sheets-Sheet 1

*INVENTOR.*
GRIFFITH MAY
BY Ezekiel Wolf, Wolf + Greenfield
ATTORNEYS

INVENTOR.
GRIFFITH MAY
BY
Ezekiel Wolf, Wolf + Greenfield
ATTORNEYS

Oct. 26, 1965 G. MAY 3,213,819

BOUNDARY LAYER CONTROL ASSEMBLY

Original Filed April 27, 1961 3 Sheets-Sheet 3

INVENTOR.

GRIFFITH MAY

BY Ezekiel Wolf, Wolf + Greenfield

ATTORNEYS

United States Patent Office 3,213,819

Patented Oct. 26, 1965

3,213,819

BOUNDARY LAYER CONTROL ASSEMBLY

Griffith May, Newton, Mass.
(131 Lexington St., Waltham, Mass.)

Continuation of application Ser. No. 106,051, Apr. 27, 1961. This application Feb. 19, 1965, Ser. No. 438,458
5 Claims. (Cl. 114—67)

This application is a continuation of my copending application Serial No. 106,051 filed April 27, 1961, and now abandoned.

This invention relates to materials having through holes small in relation to the material thickness. One useful application of these materials is for boundary layer control of fluids to reduce or eliminate turbulence.

At the present time holes are produced in sheet materials by punching, perforating, drilling, piercing, etching or electrochemical methods. With each of these methods, the minimum hole size obtainable is limited by the sheet thickness used. To date, the smallest hole size to thickness ratios have been obtained by various drilling methods; however, these methods are prohibitively expensive when holes are to be formed over large areas of sheet material at a hole density in the general range of ten to one thousand holes per square inch. Of the economical methods available, the smallest hole size to material ratio is obtained by piercing which can produce openings in the order of one-half the sheet thickness.

A typical example of an application requiring a porous material having very fine holes in relation to its thickness is in fluid boundary layer control. It is well known that the drag forces on a solid surface moving approximately parallel to an adjacent fluid can be markedly reduced if turbulent flow can be prevented so that laminar flow is maintained at higher relative velocities. A number of experimenters have found that turbulence can be prevented by causing small quantities of the fluid to flow normally through the solid surface, this normal flow to be approximately uniform over the surface in contact with the fluid. The solid material must then have many very fine openings and at the same time be sufficiently thick to meet structural strength and rigidity requirements.

Useful applications of boundary layer control include pumps, valves, pipes, turbines, hydraulic motors and vehicles moving through fluids. Boundary layer control is particularly desirable for water vehicles such as submarines and torpedoes, where a large proportion of the driving power required to move the vehicle through the water is consumed in overcoming skin friction. It has been estimated that the power requirement for a torpedo could be reduced by approximately thirty percent by elimination of turbulent flow along its surfaces.

Because of the difficulties and/or expense of producing multiple fine holes as cited above, recent attempts to produce porous sheet materials for liquid boundary layer control have been either of multilayer types in which thin porous materials, i.e. wire cloth, have been built up in layers and then bonded or fused together or the bonded particle or strand type in which individual particles or strands are fused or bonded together. While many of the materials produced under one or another of the above approaches adequately satisfy the requirements of porosity and material strength, in actual practice their use is extremely limited due to the rapid rate at which they become plugged with contaminates from the water passing through them. The tortuous flow passages through these materials cause them to act as fairly effective filters. In addition, because much of the contaminates trapped lie inside the material, cleaning is extremely difficult if not impossible.

The primary object of my invention is to provide a sheet material having perforations therein of a size and shape not limited by the thickness of the material.

Another object of my invention is to provide a porous material which may be fabricated economically with different densities of perforations.

A more specific object of my invention is to provide a boundary layer control material suitable for use on all types of water vehicles.

The porous material embodying my invention is made up of parallel strands of ribbon secured side by side in abutting relationship. One or both of the abutting sides of the adjacent strands are notched transversely across their face to define an opening between the adjacent strands. The strands of ribbon may either be precut in selected lengths and thereafter be placed side by side, or the strands may be integrally connected forming part of a longer continuous ribbon which is folded back and forth upon itself to form a flat sheet, or which is wound in the form of a helix to form a cylindrical shell of porous material. The notches in the side of the ribbon may be formed in one of several shapes and of either uniform or varying cross section. The adjacent strands of ribbon may form either a self-supporting sheet by securing the adjacent strands together by bonding or other means, or the sheet composed of the strands may be pressure loaded at its sides by external means to retain the strands in side by side relationship or by bonding or attaching the adjacent strands to a sheet or plate on the downstream side of the material.

When the porous material is used in boundary layer control, it may form a skin spaced from the normal exterior surface of the vehicle to which it is applied. The porous material and the normal outer surface of the vehicle define a cavity into which a portion of the boundary layer of the water may be drawn. The porous material serves to bleed off a portion of the water boundary layer and to remain effective, the holes in the material must not become clogged. Therefore, it is desirable that the inlet end of each hole be smaller in cross section than the rest of the hole, so that particles which enter the openings readily pass through them, and those particles too large to pass through the openings are trapped at the outside surface where they may be easily removed. The function of the porous material is not to filter out particles larger than a particular size but rather to bleed off small amounts of liquid from a larger mass. In boundary layer control the porous material used should have a small open area and allow little flow, and the pressure drop across the material should be a fixed and finite value. These characteristics are foreign to filters. In filters a large open area is normally desired, maximum flow should occur, and the material should create the smallest possible pressure drop across it.

My invention will be better understood and appreciated from the following detailed description read in connection with the accompanying drawings, in which.

Figure 4:
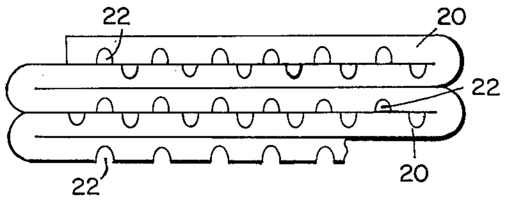
Figure 7:
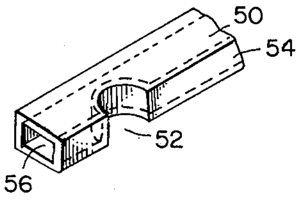
Figure 5:
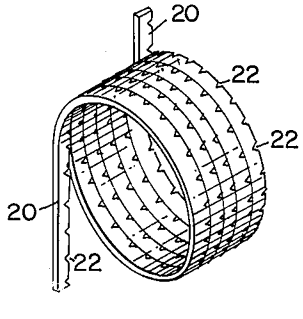
Figure 6:
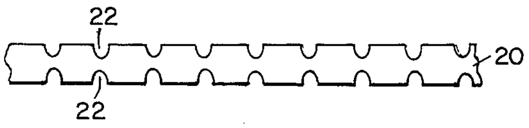
Figure 9:
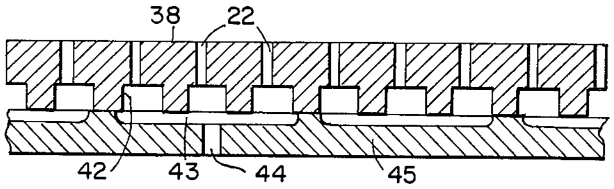
Figure 10A:
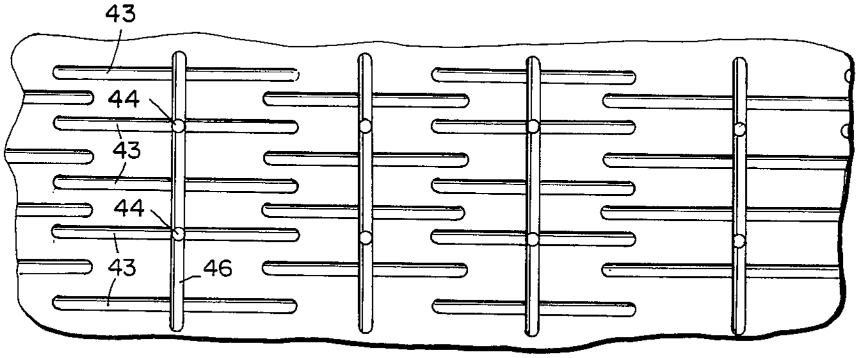
Figure 10B:
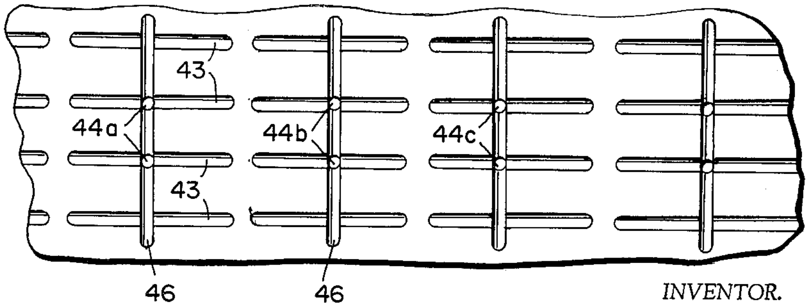
Figure 11:
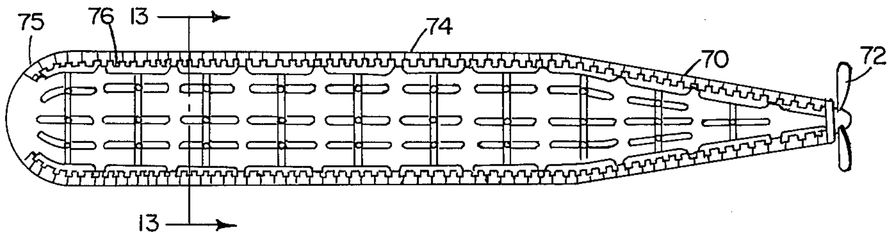
Figure 12:
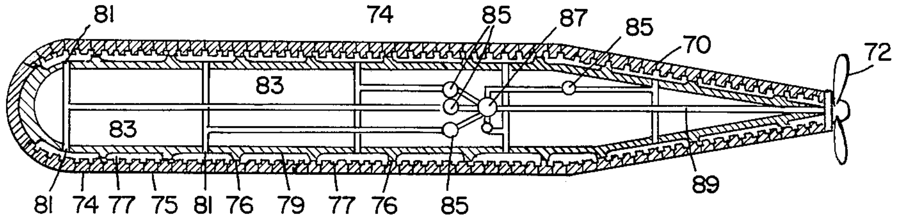
Figure 13:
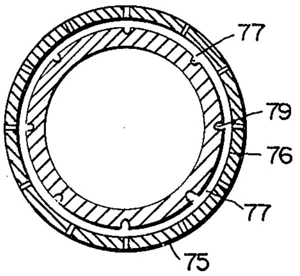

FIGS. 3*a* to 3*e* are fragmentary views showing different forms of notches which may be formed in the porous sheet;

FIG. 4 is a plan view showing a method of forming a sheet from strands of ribbon;

FIG. 5 is a view in perspective showing another method of forming a sheet;

FIG. 6 is a plan view showing a different arrangement of notches in a strand of ribbon;

FIG. 7 is a view in perspective of a portion of a hollow ribbon used to make a porous sheet;

FIGS. 8*a* to 8*e* are cross sectional views taken through the notches of different shapes of ribbon which may be used in forming a porous sheet;

FIG. 9 is a cross sectional view showing strands of ribbon bonded to a support sheet to produce a porous sheet assembly;

FIGS. 10*a* and 10*b* are plan views of support sheets which may be used to make a porous sheet assembly;

FIGS. 11 and 12 are side views partly in section showing the application of the porous sheet as a boundary layer control device in torpedoes; and FIG. 13 is a cross sectional view taken along line 13—13 of FIG. 11.

Figure 1:
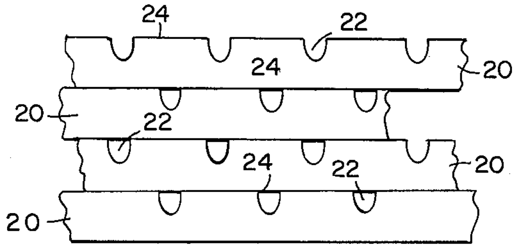
FIG. 1 is a plan view of a porous sheet constructed in accordance with my invention.

The porous sheet shown in FIG. 1 is composed of several strands of ribbon 20 provided with notches 22 along one side 24. The notches 22 in the sheet shown are spaced uniformly along the sides 24 to form openings through the sheet of uniform density.

Figure 2:
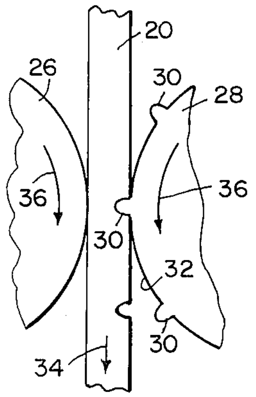
FIG. 2 is an elevation view disclosing one method of making the porous sheet shown in FIG. 1.

The strands 20 may be fabricated in the manner suggested in FIG. 2. In that figure, a pair of rollers 26 and 28 are disposed adjacent one another with their opposing faces spaced apart a distance equal to the thickness of the ribbon 20. The roller 28 bears several spaced teeth 30 that extend outwardly from its cylindrical face 32 and serve to form the notches 22 in the ribbon. The rollers 26 and 28 may be driven by any convenient means and when driven will draw the ribbon 20 between their opposed faces once the lead end of the ribbon is threaded between them. The rollers will feed the ribbon 20 in the direction suggested by arrow 34 when the rollers turn in the direction suggested by arrow 36. Of course the drive may also be provided by pulling the ribbon directly.

Figure 3:
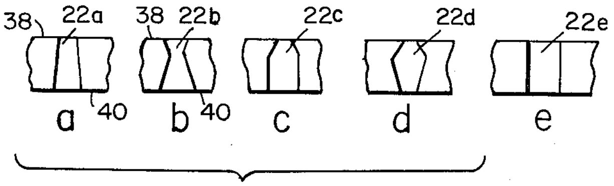

I have suggested that notches 22 formed in the side of the ribbon may take many different shapes. In FIGS. 3*a* to 3*e* five different shapes are suggested. In FIG. 3*a*, the sides of the notches **22*a* diverge from the face 38, the upstream surface, to the face 40 downstream of the ribbon and therefore, its cross section gradually increases throughout its length from face 38 to face 40**. In FIG. 3*b* the notch **22*b* has a venturi shape, that is, it has a restriction 42 between its ends at faces 38 and 40** of the ribbon. In FIG. 3*c* the notch **22*c* increases rapidly in cross section from the face 38** of the ribbon and thereafter its cross section remains uniform. In FIG. 3*d* yet another notch shape is suggested at **22*d***. In FIG. 3*e* a straight notch is represented.

The ribbon may be made of substantially any material such as plastic or metal and may either be of solid or hollow stock, the latter being suggested in FIG. 7. When hollow stock is employed, the notches should merely provide crimps in the side wall of the ribbon, and not cut through the wall so as to communicate with the center. Thus, in FIG. 7, the ribbon 50 is provided with a notch 52 which merely crimps the wall 54 and does not break through to the hollow center 56. Certain advantages are derived from making the ribbon of hollow stock. For example, with such material the hollow center 56 readily receives the displaced material from the wall resulting from the crimping, while with solid stock the displaced material may constitute a problem. Further, substantial and important weight savings can be derived from the use of hollow stock.

To form the sheet, the ribbon notched by the rollers 26 and 28 may be cut in uniform length and placed side by side as suggested in FIG. 1. Alternatively, a continuous length of ribbon may remain uncut but be folded back and forth upon itself as suggested in FIG. 4.

In FIG. 5, yet another method of forming a sheet is suggested. In this embodiment the ribbon 20 is wound into a cylinder and the notches 22 in the ribbon lie between the adjacent turns. When the cylindrical shape of material is desired, the ribbon may be preformed to provide it with the desired curvature so that it will assume the cylindrical shape without stressing the material. This curvature may be introduced into the ribbon at the time the notches are formed by forming the rollers 26 and 28 as cones with their axes disposed at right angles to one another. In this form, the cones in cross section define triangles with the angles at the cone apexes being 90°. While this manner is suggested to provide the ribbon with the desired curvature so that it may be wound easily into the sape shown without buckling, the result may be achieved in other ways. For example, the notches may be formed in a separate step before or after the curvature is introduced into the ribbon.

The particular use and size of the cylinder will determine whether a frame or core is required to support the sheet. In the severa embodiments of my invention, the adjacent strands may be secured together by any one of several ways. For example, the adjacent strands may be secured together by brazing and the brazing material may be included as a plating on the ribbon when the ribbon is formed. Alternatively, high frequency arc welding, resistance welding, or plastic bonding may be employed. As still another method to hold the sheet together, particularly applicable when the ribbon is wound to form a cylinder, is to apply pressure to the outer turns of the ribbon at the ends of the cylinder. When the strands are welded together, it is important that flashing be avoided which would fill the notches. Because flashing may constitute a problem in the formation of the sheet, plastic bonding is perhaps the best mode of adhering the adjacent strands together.

While the foregoing description suggests that the ribbon be notched on one side, it is to be understood that notches may be formed on opposite sides of the ribbon in the manner illustrated in FIG. 6. The spacing and location of the notches will be determined by the desired density of the openings in the finished sheet and this in turn will be controlled by the end use of the material. It is also possible to vary the density of the openings by varying the spacing between notches when the ribbon is initially formed. This may readily be accomplished by providing rollers with different sized, shaped, or spaced teeth on its surface. Notches may also be produced by cutting in which case notch depth and spacing may be varied by changing the speed and position of the ribbon under the cutter.

Figure 8:
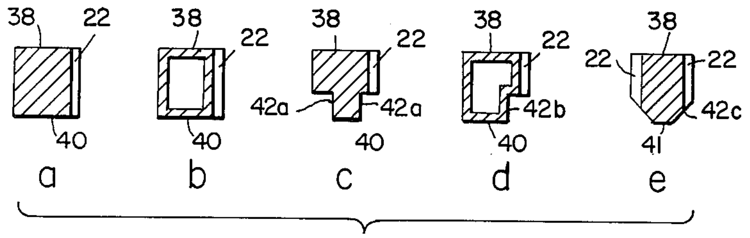

In the application of porous media to boundary layer, control supporting members must not block the flow passages. Further, it is same times advantageous to be able to control the amount of flow through various porous areas. In FIGS. 8*c* to 8*e* are shown ribbon cross sections which may be used against a flat surface on the downstream side. In FIG. 8*c* the channel **42*a* terminates the notch 22 short of any support surface against downstream side 40** of the ribbon, thus insuring that the openings remain unblocked. In FIGS. 8*d* and 8*e* are shown other shapes to accomplish this same purpose.

In FIG. 9 a sheet is shown made up of several strands of ribbon having the cross section of the ribbon of FIG. 8*c*. Note in FIG. 9 that when the sheet of ribbons is carried on a support sheet 45, the channels 42 form flow passages at right angles to the notches 22. Flow from the notches 22 proceeds along the channels 42 until it reaches a groove 43 in the support sheet 45, and then continues to openings 44 which extend through the support sheet. In many applications the support sheet 45 may be of perforated material. Welding, brazing or bonding may be done between the ribbon and the support sheet at surface 41 to reduce or eliminate problems of flash into the notches 22 created by joining adjacent ribbons to each other. Greater strength may also be realized.

In FIGS. 10*a* and 10*b* are shown some grooved support sheets. In FIG. 10*a*, the ends of the grooves 43 formed in the supporting face of the sheet overlap one another to produce the most uniform and minimum pressure drop. In FIG. 10*b* the support sheet is sectionalized so that different flow rates may be obtained between areas drained by openings **44*a*, 44*b*, 44*c***, etc. By extension of these groove networks, any degree of flow control from one porous area to another may be obtained. These groove and opening patterns may also be extended to cylindrical and three dimensional surfaces.

In FIGS. 11 and 12 underwater vehicles are illustrated having a porous skin for boundary layer control. In FIG. 11 a torpedo 70 is diagrammatically represented having a screw propeller 72 disposed at its rear. The porous skin 74 is comprised of T-shaped notched ribbon 75 that may be identical in cross section to the ribbon of FIG. 8*c*. It is wound on and bonded to the grooved presure hull surface 76. The grooved pattern on the pressure hull surface 76 may be of a pattern simiar to those suggested in FIGS. 10*a* and 10*b*. In FIG. 12 is represented the internal piping, valves, and pump by which water is drawn through the porous skin 74 along the pressure hull surface 76 through channels 77 formed by adjacent ribbons 75, to pressure hull grooves 79, thence to pressure hull openings 81 through pipes 83 to valves 85 and the pump 87, and discharged rearwardly through pipe 89.

Since the required normal flow to prevent turbulence is not uniform axially along the surface of the torpedo and further, since the normal flow required changes with vehicle velocity, the valves 85 are introduced which together with the proper groove pattern in the pressure hull surface 76 permits control of normal flow through individual annular segments. The settings of the valves 85 can be varied as a function of vehicle velocity to insure proper flow through the porous surface to prevent turbulence over the vehicle speed range.

Having described in detail several embodiments of a porous material and a particular application of the material in boundary layer control, the advantages of my invention will now be apparent. The formation of the porous material in the manner described enables one to obtain as small an open area as desired and the minimum diameter or width of each of the passages is independent of the material thickness. The pores or openings in the material may be distributed in any desired density and the density may vary from location to location within a single sheet. A wide selection of cross sectional shapes is available for the passages and the cross section of each passage may vary along its length. And the size of the holes formed in the sheet may be smaller than those achieved when punching, drilling, or piercing techniques are employed. When used for fluid purposes, the material functions with a minimum of contaminate pickup and may be readily cleaned.

From the foregoing description, those skilled in the art will appreciate that numerous modifications may be made of my invention without departing from its spirit. Therefore, I do not intend to limit the breadth of my invention to the specific embodiments illustrated and described. Rather, it is my intention that the breadth of my invention be determined by the appended claims and their equivalents.

What is claimed is:

1. A boundary layer control assembly for reducing drag forces on underwater vehicles comprising
   - a supporting core sheet generally axially symmetric in shape and having a plurality of grooves in its outer surface,
   - passage means each interconnecting a group of said grooves,
   - openings through the core sheet forming fluid communication means between the interior of the core and the passage means,
   - a strand of wire wound as a helix about the core and providing a surrounding generally axially symmetric skin on the core with the sides of each turn of wire engaging the adjacent turns,
   - inwardly displaced small radial notches provided in one side of the wire at closely spaced intervals throughout the extent of the wire and extending from the face of the wire away from the core toward the core,
   - a channel formed in the side of the wire in which the notches are formed and in the face of the wire adjacent the core and communicating with the grooves on the surface of the core and separating the notches from the core surface,
   - and pump means and means interconnecting said pump means and said openings for producing a pressure drop from the outer to the inner surface of the skin for drawing small controlled quantities of water through the notches from the outer surface of the skin.

2. A boundary layer control assembly as defined in claim 1 further characterized by
   - said notches increasing in size from the outer surface of the skin to the inner surface of the skin.

3. A boundary layer control assembly as defined in claim 1 further characterized by
   - said wire being hollow.

4. A boundary layer control assembly for reducing drag forces on surfaces moving relative to a contacting fluid comprising,
   - a supporting core,
   - strands of wire mounted on the core and providing a skin on the core with the sides of the strands of wire engaging the adjacent strands,
   - inwardly displaced small notches provided in one side of the strands of wire at closely spaced intervals and oriented generally normal to the outside surface and providing controlled resistance to flow of small quantities of fluid drawn through the notches from the outside surface,
   - channels formed in the side of the strands of wire and in the face of the strands of wire adjacent the core and reaching from the inner surface of the strands of wire contacting the core to the notches,
   - and pumping means and means interconnecting said pumping means and channels for producing a pressure drop from the outer to the inner surfaces of the skin for drawing small quantities of fluid through the notches from the outside surface of the skin.

5. A boundary layer control assembly for reducing drag forces on underwater vehicles comprising,
   - a supporting core generally axially symmetric,
   - a strand of wire wound as a helix about the core and providing a surrounding generally axially symmetric skin on the core with the sides of each turn of wire engaging the adjacent turns,
   - inwardly displaced small notches provided in one side of the wire at closely spaced intervals throughout the length of the wire and extending from the outer surface of the skin toward the core,
   - a channel formed in the side of the wire and in the face of the wire adjacent the core and reaching from the inner surface of the skin contacting the core to the notches,
   - and pumping means and means interconnecting said pumping means and said channel for producing a pressure drop from the outside to the inside surfaces of the skin for drawing small controlled quantities of water through the notches from the outer surface of the skin.

References Cited by the Examiner

UNITED STATES PATENTS

| | | | |
|---|---|---|---|
| 2,743,247 | 4/56 | Lachmann | 244—130 |
| 2,969,759 | 1/61 | Giles | 244—130 X |

REUBEN FRIEDMAN, *Primary Examiner.*